(No Model.)
G. R. GLEASON.
SOLDERING MACHINE.
No. 254,208. Patented Feb. 28, 1882.
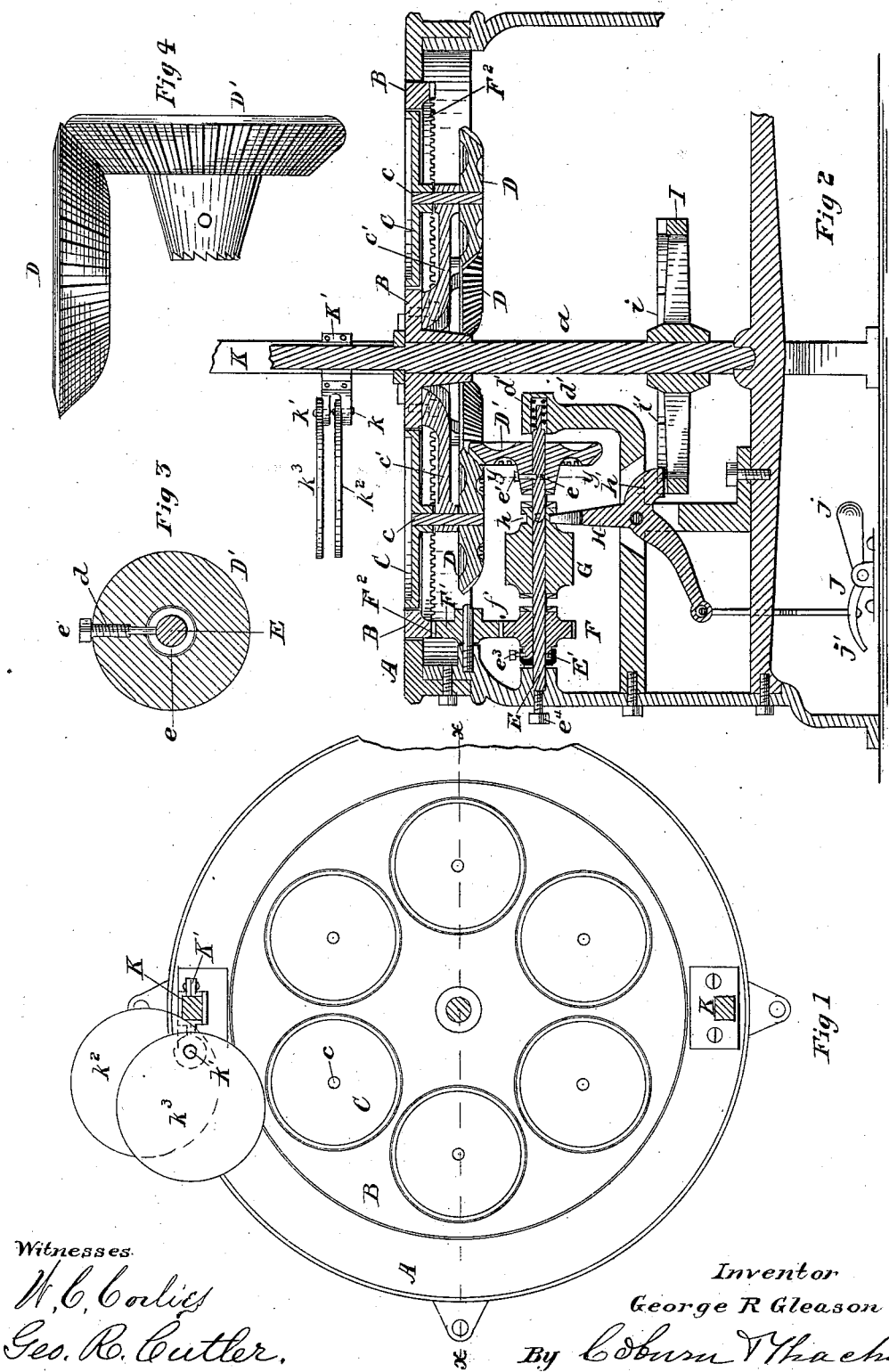
Witnesses
W. C. Cooley
Geo. R. Cutler.
Inventor
George R Gleason
By Coburn & Thacher
Attorneys

UNITED STATES PATENT OFFICE.

GEORGE R. GLEASON, OF CHICAGO, ILLINOIS, ASSIGNOR TO THE UNION BRASS MANUFACTURING COMPANY, OF SAME PLACE.

SOLDERING-MACHINE.

SPECIFICATION forming part of Letters Patent No. 254,208, dated February 28, 1882.

Application filed November 14, 1881. (No model.)

*To all whom it may concern:*

Be it known that I, GEORGE R. GLEASON, a citizen of the United States, residing at Chicago, in the county of Cook and State of Illinois, have invented certain new and useful Improvements in Soldering-Machines, which are set forth in the following specification, reference being had to the accompanying drawings, in which—

Figure 1 is a plan view of a machine embodying my improvements, the tail-spindles and certain coacting parts being omitted; Fig. 2, a longitudinal section of the same, taken on the line $x\ x$ of Fig. 1; Fig. 3, a detail section of the hub of the bevel-wheel of the driving-shaft, taken on the line $y\ y$ of Fig. 2; and Fig. 4, a detail view of the bevel-wheel on the main shaft and one of the disk-rotating bevel-wheels.

My invention relates to a machine which presents cans to the operator and their edges to the soldering-tool, being an improvement on the soldering machine for which Letters Patent No. 227,164 were granted to me May 4, 1880.

My invention consists of means whereby the rotation of the table can be ended and that of the can-disks begun automatically.

In the drawings, A represents the frame of the machine, in which is mounted the shaft $a$, on which is rigidly secured the table B. In this table are circular openings, in each of which is located a disk, C, mounted rigidly on a shaft, $c$, having bearings in the bracket $c'$ of the table. The shaft $c$ depends a little below the bracket, and on this projecting portion of the shaft is rigidly secured the beveled cog-wheel D, which meshes with the beveled cog-wheel D', which is mounted on the shaft E so as to rotate independently thereof, but is secured against longitudinal motion thereon by the annular groove $e$ therein and the screw-threaded guide-pin $e'$, inserted through a threaded recess in the hub $d$ of the wheel D'.

The back ends of the teeth of the wheel D' are rounded off, as shown in Fig. 4, to prevent their digging into the teeth of the wheel D, which latter teeth are presented broadside to the former on the approach of the disk to its engaging position. The front or lower ends of the teeth of the wheel D are similarly rounded off to prevent their digging into the teeth of the wheel D', which latter teeth are presented broadside to the former on the receding of the disk from its engaging position, (this receding as well as approaching of the wheel D being caused by the rotation of the table, as hereinafter set forth,) while the wheel D' has bearings which are immovable, except to the slight extent hereinafter described. In disengaging, these rounded ends of the teeth (which here, as in the above-described operations, work on the principle of the inclined plane) also enable the wheels, which in their normal engagement gear together loosely, to climb out of their locked position when, by the rotation of the table, the teeth of the wheels tend to assume a transverse position, each series in respect to the other, which transverse position, without such climbing, could be attained only by the twisting off of the teeth.

Of course it may be necessary, when turning off the superfluous periphery, to pare down the digging-corners below the bases of the teeth. The teeth of one wheel are permitted to assume their transverse contiguous unlocked position in relation to the other wheel's teeth (which position they have on the disk-wheel's approaching and leaving the position of its normal engagement) by reason of the insertion of the spiral spring $d'$ in the cavity of the bearing of and beyond the bearing end of the shaft E, thus permitting of a longitudinal motion of said shaft to an inner position until the pressure caused by the contact of the wheels in such transverse unlocked position as to their teeth is relieved by their interlocking or by their final disengagement, as the case may be, in which cases the pressure of the spring returns the shaft E to the position shown in Fig. 2, where it is stopped by the screw-stop $e^4$.

Near the outer end of the shaft E is an annular collar, E', which is rigidly secured to the shaft E, and is recessed to receive the hub of the wheel F, on which hub is turned an annular groove, in which rides a guide-pin, $e^3$, which is screwed through the collar E'. This groove and guide-pin operate to secure the wheel F against longitudinal motion on the shaft E, as do the grooves $e$ and pin $e'$ to secure the wheel D' against such motion. The cogs of the wheel F mesh with those of the wheel F', which latter wheel is mounted on a stud, $f$, projecting from the frame A. The wheel F' meshes in a circular rack, $F^2$, secured to and concentric with the table.

Between the wheel D' and the wheel F is sleeved on the shaft E the driving-pulley G, the hub of which terminates at both ends in clutches, for which corresponding clutches are provided on the wheels F and D'. This pulley is operated back and forth by the lever H by means of the annular groove $h$ on the hub and a yoke and pins on the end of the lever, which co-operate with said groove in the usual manner. The lever H has an arm, $h'$, which rides on the felly $i$ of the wheel I, keyed to the shaft $a$. When the arm $h'$ is at this level the pulley G is in engagement with the wheel F and the table is revolving; but when the wheels D D' are about to come into their normal meshing position the arm $h'$ begins to enter a notch, $i'$, in the felly $i$, the diameter of which notch near its top is greater than the corresponding thickness of the arm $h'$ near its lower end, thus allowing the arm $h'$ to partially descend before opposing the revolution of the wheel I and table B. This is to allow the pulley G to be disengaged from the wheel F, and thereby from the rack $F^2$, by the dropping of the arm $h'$, and before said arm opposes the revolution of the rack and table by striking the opposite side of its notch $i'$, which it does when the wheel D reaches its normal meshing position in relation to the wheel D'. The arm $h'$ enters these notches by pressure upon the forward end $j$ of the treadle J, and the construction of my present machine is such that this pressure may be continuous during the riding of the arm $h'$ over the felly $i$ between notches, as well as when the arm $h'$ is over its notch, and consequently may be exerted by a dead-weight as well as by the foot of the operator, thus relieving him in either case from the necessity and difficulty of making the nicely-timed movement of the treadle which is required in my former machine, (above referred to,) by reason of the fact that the mere pressure of the locking-pin in that machine causes the practical destruction of the engagement of the gear connecting the driving-pulley with the table, whereas in my present machine no mere pressure of the arm $h'$ will affect the engagement of the gear connecting the driving-pulley with the table, said pulley disengaging from the wheel F only after some appreciable motion of the arm $h'$ sufficient to release from engagement with each other the wheels G and F.

The effect of the dropping of the arm $h'$ is twofold, not only releasing the wheel F and stopping the table, as above explained, but also engaging the pulley G with the wheel D'. When it is desired to stop the rotation of the disk C the operator presses down the end $j'$ of the treadle until the pulley engages with the wheel F. This throw of the lever usually raises the arm momentarily somewhat above the felly $i$. This construction is adopted in order to admit of the inward thrust of the collar E' and wheel F with the shaft E without unduly pressing the arm $h'$ down upon the felly $i$.

On a standard, K, rising from the frame A just outside of the periphery of the table, is secured a bracket, K', having vertical pivots $k$ $k'$, on which respectively swing the shelves $k^2$ $k^3$, which shelves, being adjustable, may be moved toward or from the operator, as convenience may dictate, and serve to hold his soldering tools and utensils when not in actual use.

The operation of my improved machine, so far as it has not already been pointed out, is as follows: Cans the tops of which are to be sealed thereto are (together with said tops placed in their position on the can) placed on the disks C by an assistant, and there secured, as described in my former invention above referred to before. By the revolution of the table the disks C approach the operator, whose position is opposite the outer end of the shaft E. When the disks C successively reach the operator they are automatically set in revolution by the weight of the heavy end $j$ of the treadle, and while thus revolving their respective can-tops and cans are soldered together by the use of the solder and soldering-tool, the edges to be soldered coming to the soldering-tool somewhat as wood on a lathe is presented to the chisel, rather than remain stationary while the tool and solder traverse a circle. When the top or cap is completely soldered to the can the operator presses down the end $j'$ of the treadle, raising the arm $h'$ either completely out of its notch, thus throwing the pulley G into engagement with the wheel F and rotating the table until another can comes up, when its disk is automatically set in revolution, as before, or partly out of said notch, thus releasing the wheel D' without engaging the wheel F, which result may occasionally be desirable in order to examine the results of the application of the solder and soldering-tool. It will be evident from the description of the riding and dropping of the arm $h'$ that the rotary motion of the table is ended and that of the can-disk begun automatically.

Having thus described my invention, what I claim as new, and desire to secure by Letters Patent, is—

1. In a soldering-machine, the clutching-pulley G, lever H, wheel I, with notches the width of which is greater than the thickness of the arm $h'$ of said lever, table B, clutching-wheel F, and wheel F', combined and operating substantially as set forth.

2. In a soldering-machine, the clutching-pulley G, lever H, having arm $h'$, wheel I, table B, can-disk C, wheel D, clutching-wheel D', and treadle J, with weight end $j$, all combined and operating substantially as set forth.

3. In a soldering-machine, the clutching-pulley G, lever H, wheel I, with notches the width of which is greater than the thickness of the arm h' of said lever, table B, can-disk C, wheels F' and D, and clutching-wheels F and D', all combined and operating substantially as set forth.

4. In a soldering-machine, the clutching-pulley G, lever H, wheel I, table B, can-disk C, wheel D, and clutching-wheel D', having their digging-edges turned down, all combined and operating substantially as set forth.

5. In a soldering-machine, the clutching-pulley G, lever H, table B, can-disk C, wheel D, clutching-wheel D', and treadle J, with weight end j, all combined and operating substantially as set forth.

GEORGE R. GLEASON.

Witnesses:
GEO. R. CUTLER,
THOMAS H. PEASE.